(12) United States Patent
Yang et al.

(10) Patent No.: US 8,068,332 B2
(45) Date of Patent: Nov. 29, 2011

(54) ACCESSORY STRAP FIXING STRUCTURE AND PORTABLE ELECTRONIC DEVICE USING THE SAME

(75) Inventors: Mu-Wen Yang, Taipei Hsien (TW);
Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 131 days.

(21) Appl. No.: 12/610,482

(22) Filed: Nov. 2, 2009

(65) Prior Publication Data

US 2010/0296231 A1      Nov. 25, 2010

(30) Foreign Application Priority Data

May 19, 2009   (CN) .......................... 2009 1 0302444

(51) Int. Cl.
*H05K 7/16* (2006.01)
(52) U.S. Cl. ............... 361/679.01; 361/679.58; 224/254
(58) Field of Classification Search ............ 361/679.01, 361/679.58, 679.02; 455/575.1–575.4; 24/3.1, 24/3.13, 129, 130; 224/255, 530
See application file for complete search history.

(56) References Cited

U.S. PATENT DOCUMENTS

| | | | | |
|---|---|---|---|---|
| 5,433,339 A | * | 7/1995 | Sarver | 220/756 |
| 5,709,012 A | * | 1/1998 | Ebashi | 24/3.11 |
| 7,106,858 B2 | * | 9/2006 | Goldberg | 379/450 |
| 7,496,991 B2 | * | 3/2009 | Avery | 24/3.3 |
| 2010/0102576 A1 | * | 4/2010 | Zhang | 292/261 |
| 2010/0118476 A1 | * | 5/2010 | Li | 361/679.01 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device includes a main body and a accessory strap fixing structure. The main body defines an assembling slot therein. The accessory strap fixing structure is rotatably assembled within the assembling slot and includes a hanging frame, a supporting frame, a hinged portion, and a latching portion. The hanging frame includes a hanging portion disposed thereon for hanging a accessory strap thereto. The two ends of the supporting frame are connected to two ends of the hanging frame respectively. The hinged portion is formed at one joint of the hanging frame and the supporting frame, for being rotatably hinged to the main body and accommodated within the assembling slot. The latching portion is formed adjacent to the other joint of the hanging frame and the supporting frame, and configured for detachably latching within the assembling slot.

13 Claims, 6 Drawing Sheets

ACCESSORY STRAP FIXING STRUCTURE AND PORTABLE ELECTRONIC DEVICE USING THE SAME

BACK GROUND

1. Technical Field

The disclosure generally relates to an accessory strap fixing structure and a portable electronic device using the same.

2. Description of Related Art

With the development of technologies, portable electronic devices such as mobile phones, MP3s, digital cameras and personal digital assistants (PDAs) are now in widespread use, and consumers may now enjoy the full convenience of high technology products almost anytime and anywhere.

The conventional portable electronic device usually has an accessory strap fixing structure disposed thereon to assemble an accessory strap to decorate the portable electronic device. However, the size of the existing accessory strap fixing structure is small and it is hard to assemble the accessory strap with the existing accessory strap fixing structure.

Therefore, there is room for improvement within the art.

BRIEF DESCRIPTION OF THE DRAWINGS

Many aspects of the present accessory strap fixing structure and portable electronic device using the same can be better understood with reference to the following drawings. The components in the drawings are not necessarily drawn to scale, the emphasis instead being placed upon clearly illustrating the principles of the present accessory strap fixing structure and portable electronic device using the same. Moreover, in the drawings, like reference numerals designate corresponding parts throughout the several views.

DETAILED DESCRIPTION

Figure 1:
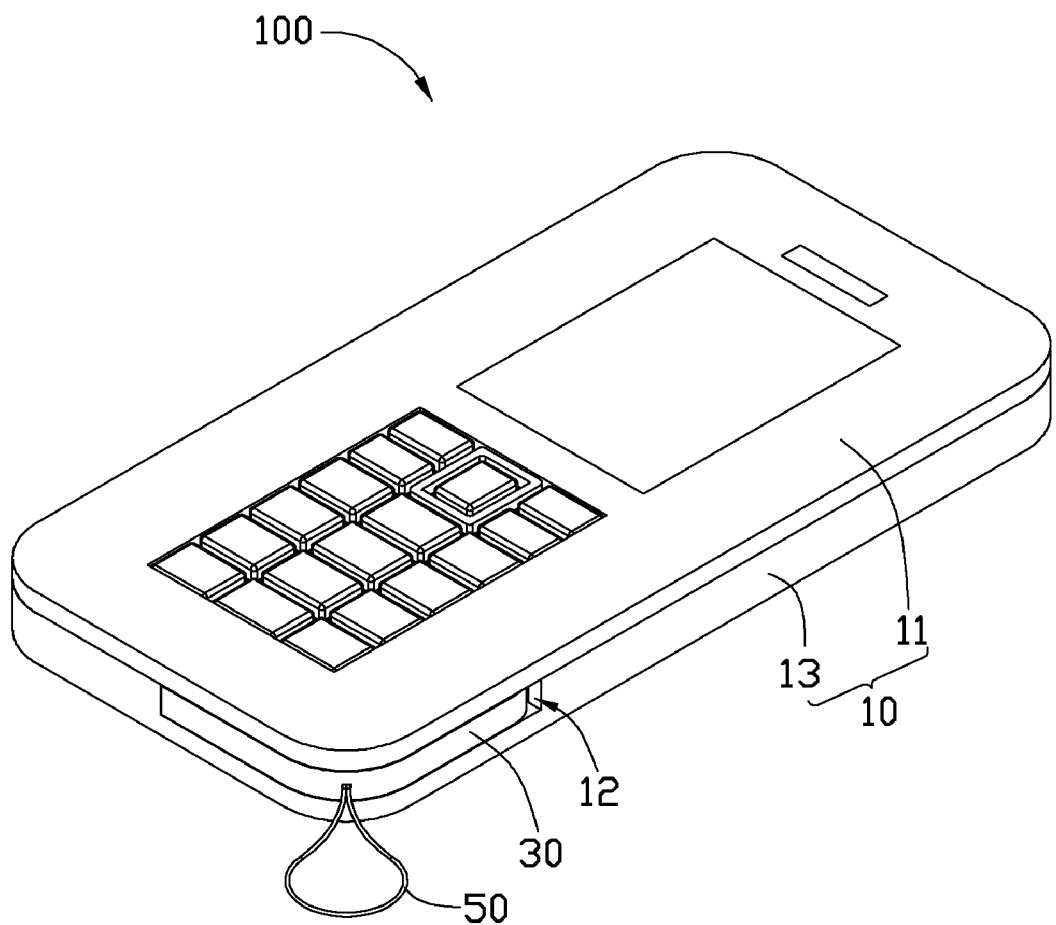
FIG. 1 shows a perspective view of an exemplary embodiment of a portable electronic device with an accessory strap fixing structure and a accessory strap assembled to the accessory strap fixing structure.

FIG. 1 shows a perspective view of an exemplary embodiment of a portable electronic device 100 with an accessory strap fixing structure 30 and an accessory strap 50 assembled to the accessory strap fixing structure 30. The main body 10 may be a mobile phone, an MP3, a digital camera or a personal digital assistant (PDA), etc. The main body 10 defines an assembling slot 12 recessed from a corner thereof. The accessory strap fixing structure 30 is rotatably assembled within the assembling slot 12 of the main body 10 and detachably latched with the main body 10 to hang and fix the accessory strap 50 of a pendant (not shown) thereto.

Figure 2:
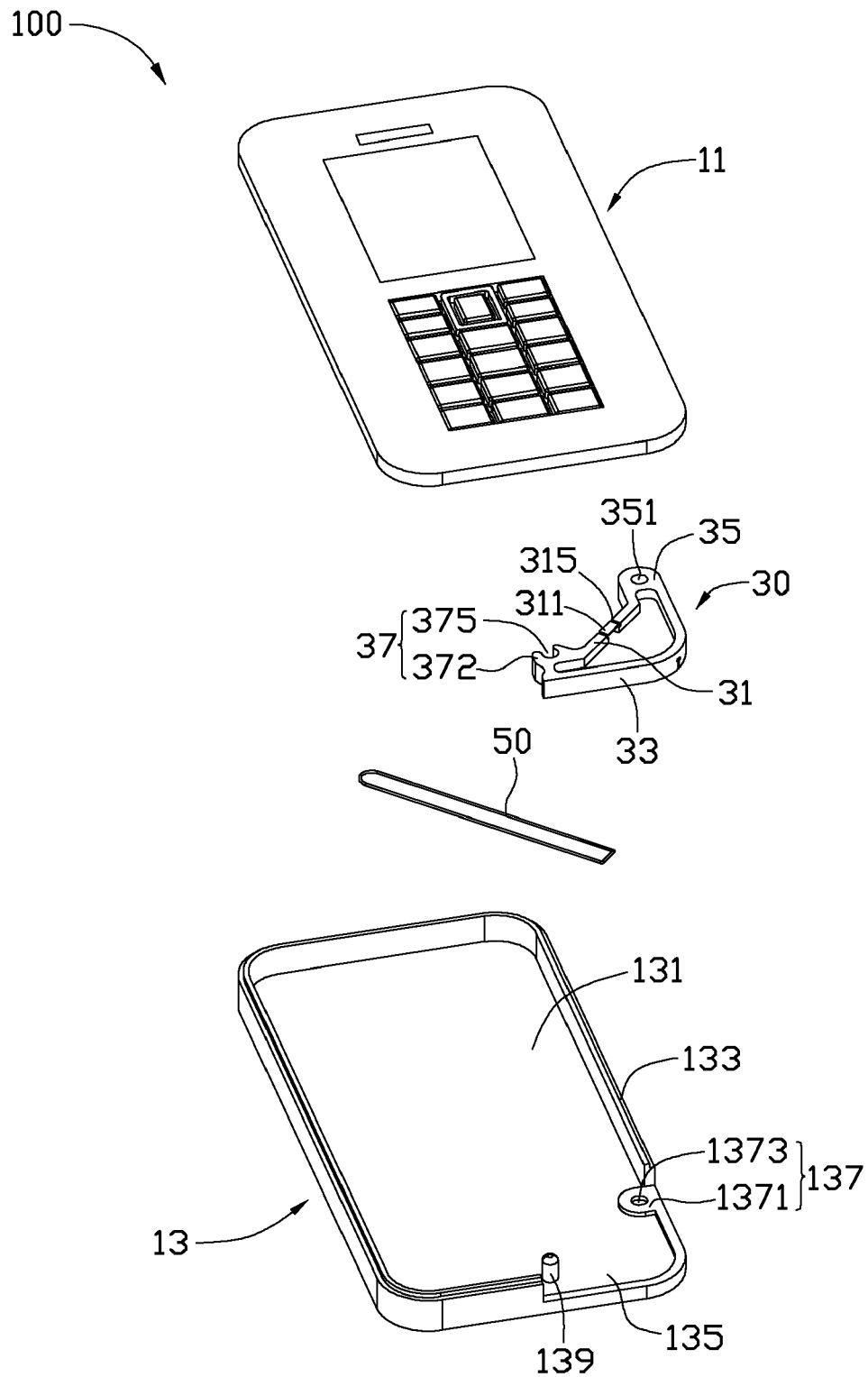
FIG. 2 shows an exploded perspective view of the portable electronic device shown in FIG. 1.
Figure 3:
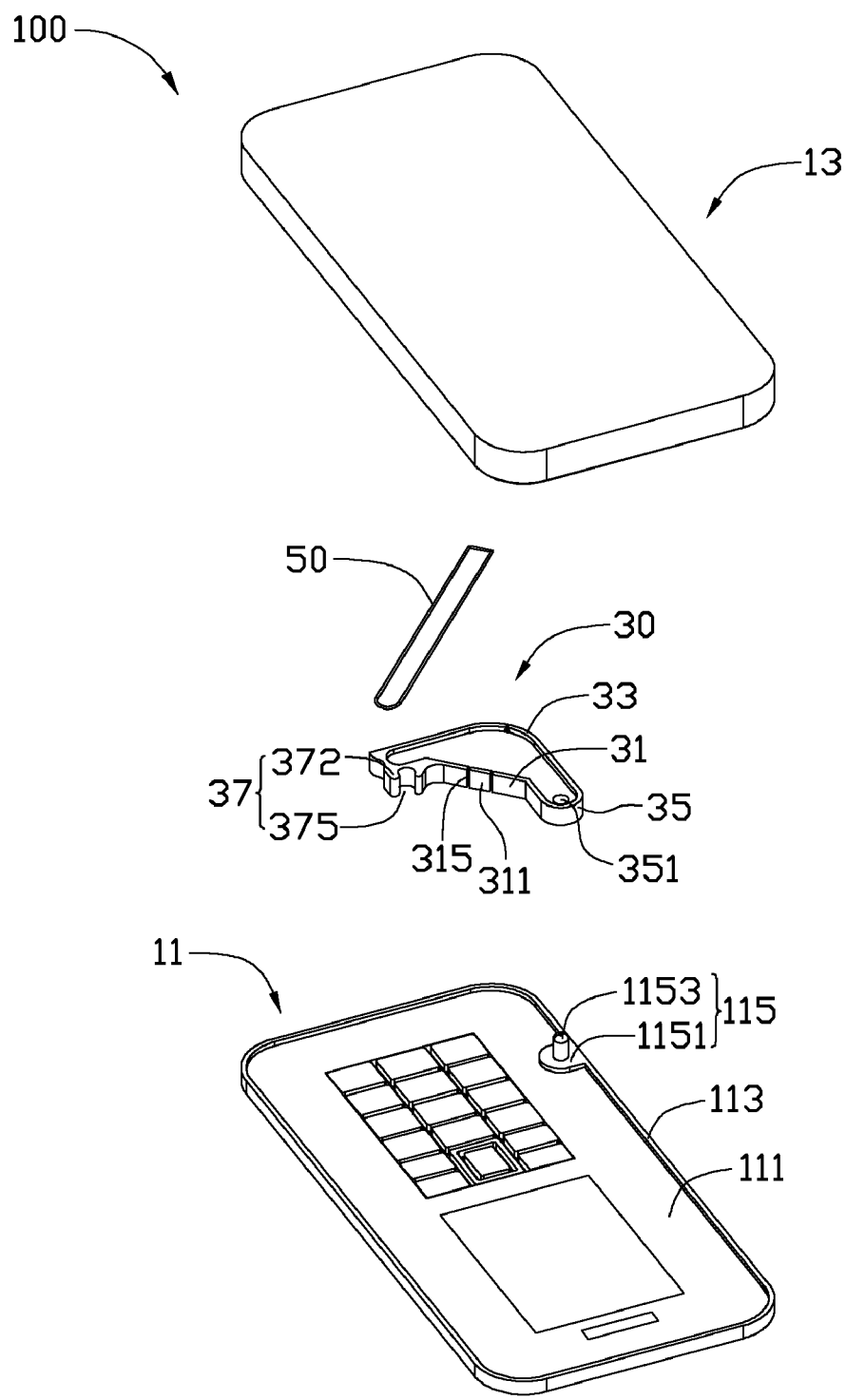
FIG. 3 is similar to FIG. 2, but viewed from another aspect.

Referring to FIGS. 2 and 3, in the exemplary embodiment, the main body 10 includes a front shell 11 and a back shell 13 detachably assembled to the front shell 11.

The front shell 11 includes an upper wall 111 and a sidewall 113 extending from a peripheral of the upper wall 111. A mounting portion 115 is formed adjacent to a corner of the front shell 11 for rotatably assembling the accessory strap fixing structure 30 thereto. The mounting portion 115 includes a supporting board 1151 and a post 1153 formed on the supporting board 1151. The supporting board 1151 extends parallelly to the upper wall 111 from the sidewall 113. The post 1153 is substantially cylindrical, and protrudes from the supporting board 1151 perpendicularly to the upper wall 111.

The back shell 13 includes a bottom wall 131 and a peripheral wall 133 extending from a peripheral edge of the bottom wall 131. A gap portion 135 is defined through a corner of the peripheral wall 133 of the back shell 13 corresponding to the mounting portion 115, for accommodating the accessory strap fixing structure 30 therein. Thus, the back shell 13 and the front shell 11 cooperatively form the assembling slot 12 therein as the back shell 13 and the front shell are assembled with each other. A retaining portion 137 is formed adjacent to one end of the gap portion 135 of the back shell 13 corresponding to the mounting portion 115 of the front shell 11. The retaining portion 137 includes a retaining board 1371 and a fixing hole 1373. The retaining board 1371 extends parallelly to the bottom wall 131 from the peripheral wall 133. The fixing hole 1373 is defined in the retaining board 1371 perpendicularly to the bottom wall 131 for engaging with the corresponding the post 1153 of the front shell 11. A latching post 139 is formed adjacent to the other end of the gap portion 135 of the back shell 13 opposite to the retaining portion 137 for clipping the accessory strap fixing structure 30. In the present embodiment, the latching post 139 is a cylinder protruding from the bottom wall 131 of the back shell 13 adjacent to the gap portion 135 and positioned spaced to the retaining portion 137.

Figure 4:
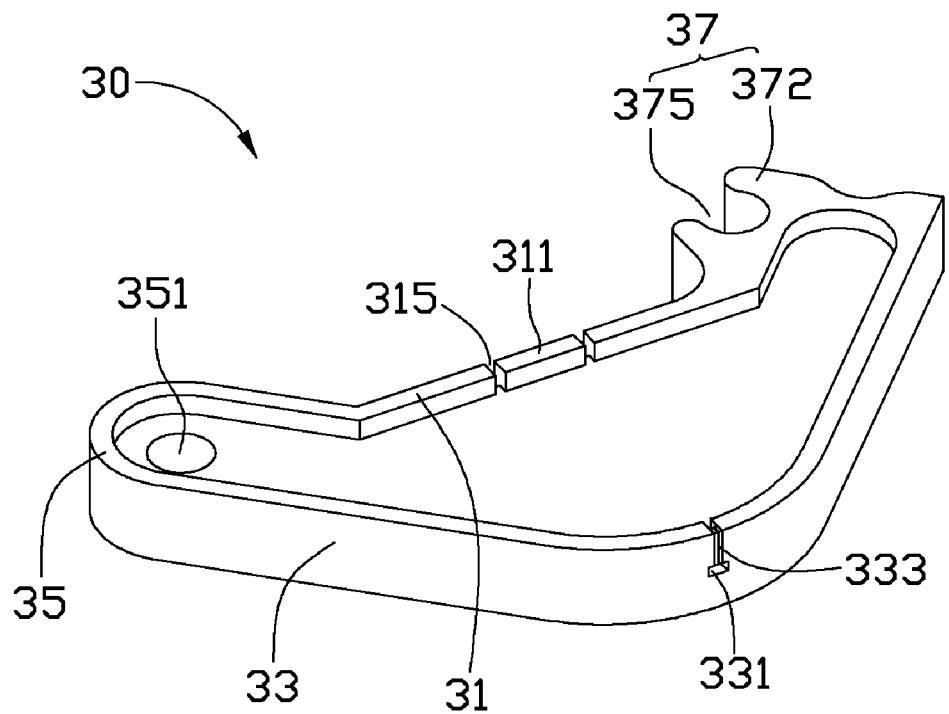
FIG. 4 shows an enlarged perspective view of the accessory strap fixing structure.

FIG. 4 shows an enlarged perspective view of the exemplary accessory strap fixing structure 30. The accessory strap fixing structure 30 is substantially triangular frame shape or wedge frame shape, and includes a hanging frame 31, a supporting frame 33, a hinged portion 35 and a latching portion 37. The hanging frame 31 is substantially bar shaped. The supporting frame 33 is substantially L-shaped or arcuate with two ends thereof connecting to two ends of the hanging frame 31 respectively. The hanging frame 31 includes a hanging portion 311 formed at a middle portion thereof for hanging the accessory strap 50 thereto. The hanging portion 311 can be, but is not limited to, a hanger, a clasp, a buckle or a latch hook. A receiving groove 315 is recessed on the hanging frame 31 surrounding the hanging portion 311 to accommodate part of the accessory strap 50. The supporting frame 33 defines a substantially inverted T-shaped slot 331 through substantially the middle portion thereof, corresponding and opposite to the hanging portion 311, for passing through and clipping the accessory strap 50. Two elastic restricting bodies 333 are formed integrally with the supporting frame 33 and positioned at two sides of the slot 331 opposite to each other for restricting and prevent the accessory strap 50 departing from the slot 331. The elastic restricting body 333 is made of elastic material such as rubber, plastic, foam material, etc. The dimension of the supporting frame 33 is substantially the same as the gap portion 135 of the back shell 13 and is configured to be fittingly received in the assembling slot 12 of the main body 10. The hinged portion 35 is formed at one joint of the hanging frame 31 and the supporting frame 33. A hole 351 is defined through the hinged portion 35 corresponding to the post 1153 of the front shell 11, for pivotally mounting the accessory strap fixing structure 30 to the main body 10. The latching portion 37 is formed adjacent to the other joint of the hanging frame 31 and the supporting frame 33 for latching to the corresponding latching post 139 of the back shell 13. In the exemplary embodiment, the latching portion 37 includes two latching arms 372 spaced protruding from end of the hanging frame 31. The two latching arms 372 and the hanging frame 31 together form a latching hole 375 configured for latching the latching post 139 therein.

Figure 5:
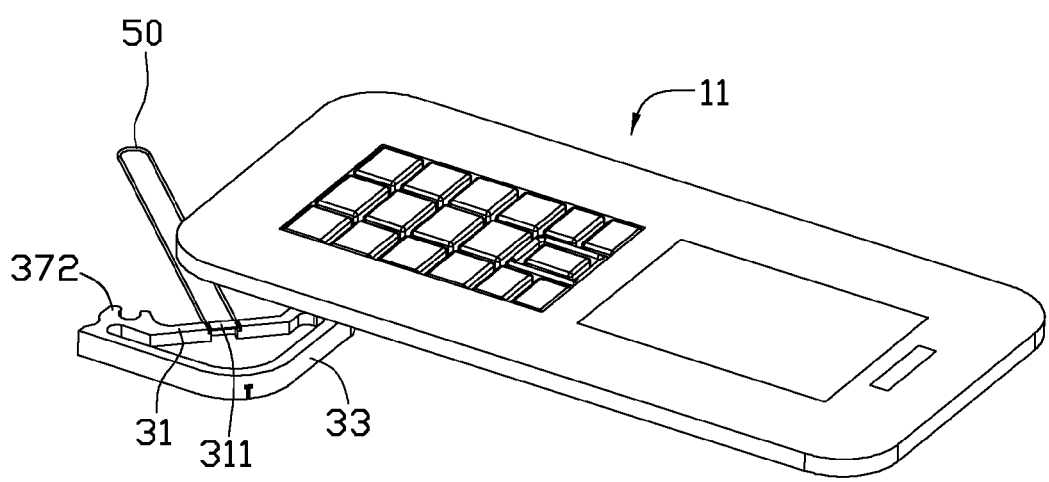
FIG. 5 shows a partially assembled view of the portable electronic device shown in FIG. 2.
Figure 6:
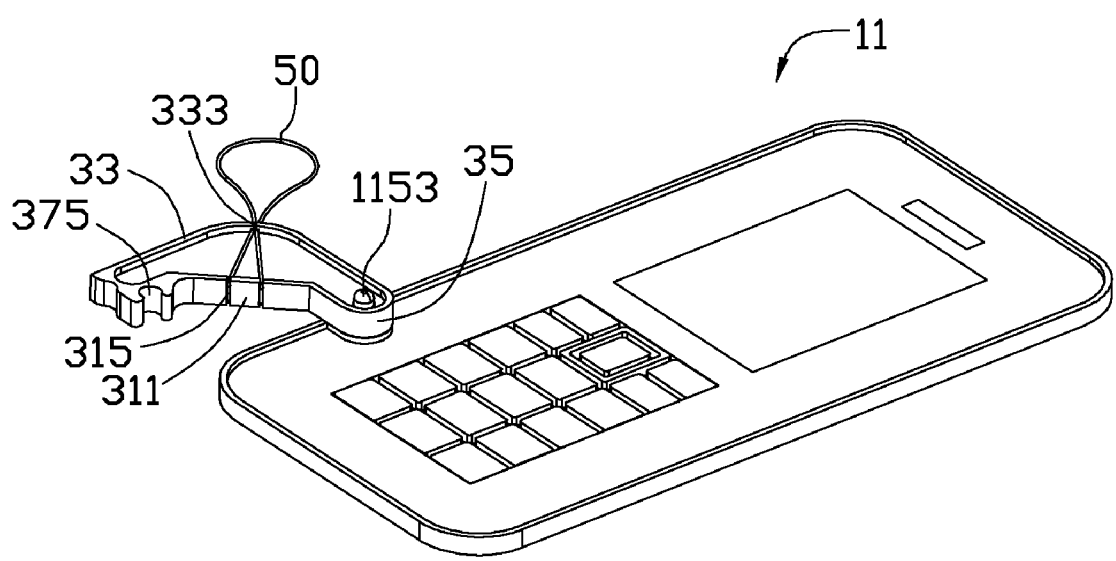
FIG. 6 shows another partially assembled view of FIG. 5.

Referring to FIGS. 3, 5 and 6, in assembly, the hinged hole 351 of the accessory strap fixing structure 30 is aligned with the post 1153 of the front shell 11. The post 1153 penetrates through the hinged hole 351 correspondingly. Thus, the hinged portion 35 of the accessory strap fixing structure 30 is rotatably assembled to the mounting portion 115 of the front shell 11. The accessory strap 50 is hung to the hanging portion 311 and wrapped around the hanging frame 31 by passing through and partially accommodated within the receiving groove 315. Then, the accessory strap 50 further penetrates through the slot 331 and is restricted/locked within the slot 331 by the two elastic restricting bodies 333. After that, the back shell 13 is assembled to the front shell 11. The retaining portion 137 is fixed to the post 1153 of the front shell 11 correspondingly. The front shell 11 and the back shell 13 together form the assembling slot 12. Finally, the accessory strap fixing structure 30 is rotated to engage into the assembling slot 12 with the latching portion 37 latching to the corresponding latching post 139 of the back shell 13. Due to the accessory strap fixing structure 50 pivotally and detachably assembled to the main body 10, the accessory strap 50 can be assembled to the main body 10 and detached from the main body 10 easily. It is convenient to replace and assemble the accessory strap 50.

It is to be understood, however, that even though numerous characteristics and advantages of the present invention have been set forth in the foregoing description, with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A accessory strap fixing structure comprising:
a hanging frame comprising a hanging portion disposed thereon for hanging a accessory strap thereto;
a supporting frame having two ends connecting to two ends of the hanging frame respectively;
a hinged portion formed at one joint of the hanging frame and the supporting frame; and
a latching portion formed adjacent to the other joint of the hanging frame and the supporting frame;
wherein the supporting frame defines an inverted T-shaped slot therethrough corresponding and opposite to the hanging portion, for passing through and clipping the accessory strap.

2. The accessory strap fixing structure as claimed in claim 1, wherein the hanging frame further includes a receiving groove recessed therefrom surrounding the hanging portion to accommodate part of the accessory strap.

3. The accessory strap fixing structure as claimed in claim 2, wherein the T-shaped slot is formed by two elastic restricting bodies formed integrally with the supporting frame and positioned at two opposite sides of the slot for restricting and preventing the accessory strap from departing from the slot.

4. The accessory strap fixing structure as claimed in claim 2, wherein the latching portion includes two latching arms spaced protruding from an end of the hanging frame and extending toward together; the two latching arms and the hanging frame form a latching hole together for latching the accessory strap fixing structure to a main body of portable electronic device.

5. The accessory strap fixing structure as claimed in claim 3, wherein the elastic restricting body is made of rubber, plastic or foam material.

6. The accessory strap fixing structure as claimed in claim 1, wherein the hanging portion includes a hinged hole defined therethrough for hinging the accessory strap fixing structure to a main body of portable electronic device.

7. A portable electronic device comprising:
a main body defining an assembling slot; and
a accessory strap fixing structure assembled within the assembling slot of the main body, comprising:
a hanging frame having a hanging portion disposed thereon for hanging a accessory strap thereto;
a supporting frame with two ends thereof connecting to two ends of the hanging frame respectively;
a hinged portion formed at one joint of the hanging frame and the supporting frame, for being pivotally mounted to the main body; and
a latching portion formed adjacent to the other joint of the hanging frame and the supporting frame, and configured for detachably latching with the main body;
wherein the supporting frame defines an inverted T-shaped slot therethrough corresponding and opposite to the hanging portion, for passing through and clipping the accessory strap.

8. The portable electronic device as claimed in claim 7, wherein the hanging frame further includes a receiving groove recessed therefrom surrounding the hanging portion to accommodate part of the accessory strap.

9. The portable electronic device as claimed in claim 7, wherein the T-shaped slot is defined by two elastic restricting bodies formed integrally with the supporting frame and positioned at two opposite sides of the slot for restricting and preventing the accessory strap from departing from the slot.

10. The portable electronic device as claimed in claim 7, wherein the main body includes a front shell and a back shell; the front shell includes a upper wall, a sidewall and a mounting portion formed adjacent to one corner thereof; the back shell includes a bottom wall, a peripheral wall and a gap portion defined through one corner of the peripheral wall corresponding to the mounting portion; the back shell and the front shell together form the assembling slot for assembling the accessory strap fixing structure therein.

11. The portable electronic device as claimed in claim 10, wherein the mounting portion includes a supporting board extending parallelly to the upper wall from the sidewall and a post formed on the supporting board; the hanging portion includes a hinged hole defined therethrough for rotatably hinging the accessory strap fixing structure to the post of the mounting portion of the front shell.

12. The portable electronic device as claimed in claim 11, wherein the back shell includes a latching post formed adjacent to the gap portion corresponding to the latching portion of the accessory strap fixing structure; the latching portion includes two latching arms spaced protruding from end of the hanging frame and extending toward together; the two latching arms and the hanging frame form a latching hole together for latching to the latching post of the back shell.

13. The portable electronic device as claimed in claim 12, wherein the back shell further includes a retaining portion formed adjacent to the gap portion corresponding to the post of the mounting portion for preventing the hinged portion departing from the mounting portion; the retaining portion includes a retaining board extending from the peripheral wall and a fixing hole defined through the retaining board for engaging with the corresponding the post of the front shell.

* * * * *